(12) United States Patent
Kurita et al.

(10) Patent No.: US 8,711,508 B2
(45) Date of Patent: Apr. 29, 2014

(54) CONTACT DETECTION BETWEEN A DISK AND MAGNETIC HEAD

(75) Inventors: Masayuki Kurita, Kanagawa (JP);
Toshiya Shiramatsu, Kanagawa (JP);
Yuki Shimizu, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 729 days.

(21) Appl. No.: 12/948,221

(22) Filed: Nov. 17, 2010

(65) Prior Publication Data

US 2012/0120521 A1  May 17, 2012

(51) Int. Cl.
*G11B 5/60*  (2006.01)

(52) U.S. Cl.
USPC .............................................. 360/55; 360/75

(58) Field of Classification Search
None
See application file for complete search history.

(56) References Cited

U.S. PATENT DOCUMENTS

| | | | |
|---|---|---|---|
| 5,751,517 A | 5/1998 | Agarwal | |
| 6,411,083 B1 | 6/2002 | Inaba | |
| 6,437,930 B1 | 8/2002 | Liu et al. | |
| 6,853,508 B2 | 2/2005 | Smith | |
| 7,362,533 B2 * | 4/2008 | Stipe | 360/75 |
| 7,450,343 B2 | 11/2008 | Huang | |
| 7,495,856 B2 | 2/2009 | Payne | |
| 7,589,928 B2 * | 9/2009 | Roy et al. | 360/75 |
| 7,796,356 B1 * | 9/2010 | Fowler et al. | 360/75 |
| 7,800,858 B1 * | 9/2010 | Bajikar et al. | 360/75 |
| 8,085,491 B2 * | 12/2011 | Antoku et al. | 360/75 |
| 8,098,450 B2 * | 1/2012 | Baumgart et al. | 360/75 |
| 8,125,728 B2 * | 2/2012 | Kurita et al. | 360/75 |
| 8,139,310 B1 * | 3/2012 | Hogg | 360/75 |
| 8,199,431 B2 * | 6/2012 | Kanaya et al. | 360/128 |
| 8,274,761 B2 * | 9/2012 | Kanaya et al. | 360/75 |
| 8,279,550 B1 * | 10/2012 | Hogg | 360/75 |
| 8,335,053 B2 * | 12/2012 | Chen et al. | 360/235.4 |
| 8,477,455 B2 * | 7/2013 | Furukawa et al. | 360/234.4 |
| 2004/0239343 A1 | 12/2004 | Takanuki et al. | |
| 2005/0007699 A1 | 1/2005 | Ohno et al. | |
| 2008/0239550 A1 | 10/2008 | Nagai | |
| 2009/0168268 A1 | 7/2009 | Druist et al. | |
| 2011/0149430 A1 * | 6/2011 | Shiramatsu et al. | 360/75 |
| 2011/0157736 A1 * | 6/2011 | Contreras et al. | 360/29 |
| 2012/0099218 A1 * | 4/2012 | Kurita et al. | 360/59 |

FOREIGN PATENT DOCUMENTS

| | | |
|---|---|---|
| JP | 04176009 | 6/1992 |
| JP | 04356747 | 12/1992 |

OTHER PUBLICATIONS

Hewlett-Packard Journal, "Hewlett Packard Journal", vol. 36, No. 11, (Nov. 1985),1, 14-15.
Liu, et al., "Study of Clock Head/Disk Interface Failure Mechanism in Servo-Writing Process", *IEEE Transactions on Magnetics*, vol. 34, No. 4, (Jul. 1998), 1723-1725.
Cha, et al., "Effect of Slider Load on the Wear Debris Contamination Tendency of Head/Slider", *IEEE Transactions on Magnetics*, vol. 35, No. 5, (Sep. 1999),2355-2357.

(Continued)

*Primary Examiner* — Wayne Young
*Assistant Examiner* — James L Habermehl

(57) ABSTRACT

A HDD including a magnetic disk, a magnetic head, an embedded contact sensor embedded in the magnetic head and configured to detect a contact between the magnetic disk and the magnetic head, and TFC embedded in the magnetic head and configured to facilitate in detecting the contact between the magnetic disk and said magnetic head.

11 Claims, 6 Drawing Sheets

(56) References Cited

OTHER PUBLICATIONS

Liu, et al., "Particle Contamination on a Thermal Flying=Height Control Slider", *Computer Mechanics Laboratory*, (Aug. 6, 2009),1-8.

Zhang, et al., "Predicting Air Bearing Contamination Using Air Flow Pattern Analysis", *J. Tribol.* vol. 130, Issue 1, (Jan. 2008),4.

Daugela, et al., "Passive Acoustic Monitoring of Head Disc Interface Interactions", *Springer-Verlag*, (Jan. 7, 2009),1-1.

Takagi, S. "Study of the Stiction Free Magnetic Recording Head with DLC Pad", *Springer-Verlag*, (May 13, 2005),1-1.

Xu, et al., "In-Situ Studies of Contamination At Head-Disk Interface", *Microsystem Technologies*, (Sep. 9, 2002),250-255.

* cited by examiner

400 perform detection of a contact between a magnetic disk and a magnetic head based, in part, on a TFC
410 performing detection of the contact between the magnetic disk and the magnetic head based on an ECS
420 in response to detecting the contact based on said TFC and the ECS, deem the contact as true contact between the magnetic disk and the magnetic head
430 in response to detecting the contact based on the ECS and not on the TFC, deeming the contact as true contact between the magnetic disk and the magnetic head
440 in response to detecting the contact based on the TFC and not on the ECS, deeming the contact as pseudo contact between the magnetic disk and the magnetic head
450

```
in response to detecting a contact between a magnetic disk and a magnetic head
based on a TFC and not based on an ECS disposed in the magnetic head, burnish
               the magnetic head to remove an ABS fence
                                 510

┌─────────────────────────────────────────────────────┐
        │   burnish the magnetic head until the ECS detects the contact │
        │                          512                        │
        └─────────────────────────────────────────────────────┘

┌─────────────────────────────────────────────────────┐
        │   burnish the magnetic head on a burnishing zone of a magnetic disk │
        │                          514                        │
        │  ┌───────────────────────────────────────────────┐  │
        │  │ burnish the magnetic head on an inner diameter burnishing zone of the │  │
        │  │                   magnetic disk               │  │
        │  │                        516                    │  │
        │  └───────────────────────────────────────────────┘  │
        │                                                     │
        │  ┌───────────────────────────────────────────────┐  │
        │  │ burnish the magnetic head on an outer diameter burnishing zone of the │  │
        │  │                   magnetic disk               │  │
        │  │                        518                    │  │
        │  └───────────────────────────────────────────────┘  │
        └─────────────────────────────────────────────────────┘ increase power to the TFC until the ECS detects the contact
                                 520
```

FIG. 5

CONTACT DETECTION BETWEEN A DISK AND MAGNETIC HEAD

BACKGROUND

As the recording density of the magnetic disk increases, it is important to reduce the clearance between the head element flying above the magnetic disk. A thermal fly height control (TFC) disposed in a head slider adjusts the clearance by using the heater to heat the head element.

In the manufacturing test for a hard disk drive (HDD), power to the TFC gradually increases. If contact is detected between the head slider and the magnetic disk, the power corresponding to the specified clearance is subtracted from the applied power and stored as the standard applied power for that head. This calibration procedure is referred to as manufacturing touch down detection. However, contamination within the HDD can skew the results of the manufacturing touch down detection.

BRIEF DESCRIPTION OF THE DRAWINGS

FIG. 4 illustrates an example of a flow chart of a method for contact detection, in accordance with an embodiment of the present invention.

FIG. 5 illustrates an example of a flow chart of a method for burnishing, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
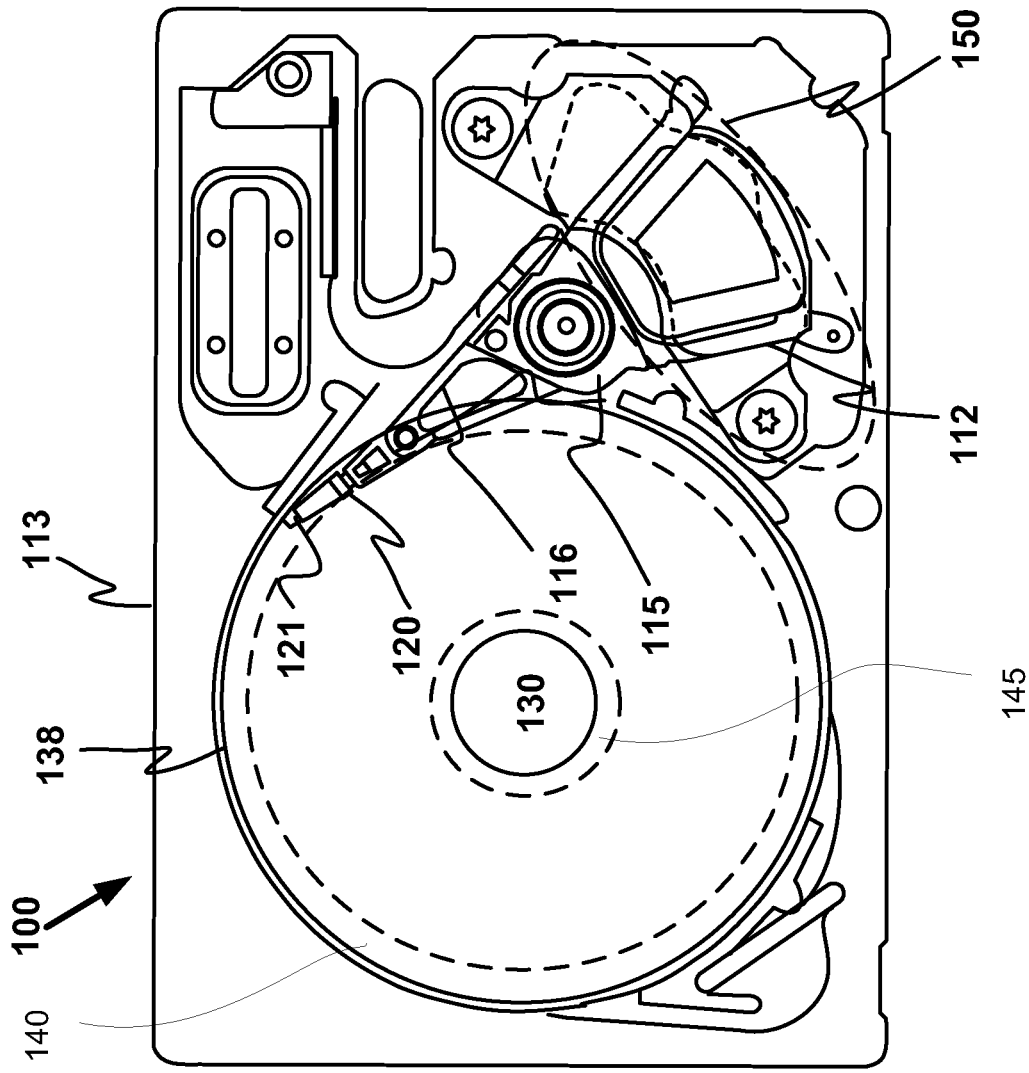
FIG. 1 illustrates an example of an HDD, in accordance with an embodiment of the present invention.

With reference now to FIG. 1, a schematic drawing of one embodiment of an information storage system including a magnetic hard disk file or HDD 100 for a computer system is shown, although only one head and one disk surface combination are shown. What is described herein for one head-disk combination is also applicable to multiple head-disk combinations. In other words, the present technology is independent of the number of head-disk combinations.

In general, HDD 100 has an internal base plate 113 and an internal cover (not shown). In one embodiment, internal housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the circumferential direction relative to internal base plate 113. An actuator assembly 115 includes one or more actuator arms 116. When a number of actuator arms 116 are present, they are usually represented in the form of a comb that is movably or pivotally mounted to base/housing 113. A controller 150 is also mounted to internal base plate 113 for selectively moving the actuator arms 116 relative to the disk 138. Actuator assembly 115 may be coupled with a connector assembly, such as a flex cable to convey data between arm electronics (AE) and a host system, such as a computer, wherein HDD 100 resides.

In one embodiment, each actuator arm 116 has extending from it at least one cantilevered integrated lead suspension (ILS) 120. The ILS 120 may be any form of lead suspension that can be used in a data access storage device. The level of integration containing the slider or magnetic head 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

In particular, the AE, which is the head IC, constitutes the IC (packaged IC) positioned in HDD 100. Typically, the AE is near the swinging axis of the actuator assembly 116 and is fixed to a flexible printed circuit (FPC) (not shown) which is associated with a portion of actuator assembly 116. A portion of the AE circuit is electrically connected to head slider 121.

In one embodiment, a part of the AE circuit is connected to a read/write channel LSI. The AE selects the head slider 121 (or magnetic head) for accessing (reading or writing) the magnetic disk 138 (in accordance with control data) and amplifies the read/write signal.

Additionally, the read/write channel LSI code modulates the write data, outputs the data to the AE, and detects the data from the read out playback waveform (e.g., the output signal of the AE, and code demodulates the data).

In a read process, the read/write channel extracts data from the read signal supplied from the AE and decodes the data. In a write process, the read/write channel code modulates the write data, converts the code-modulated data into a write signal, and supplies the signal to the AE.

Figure 2A:
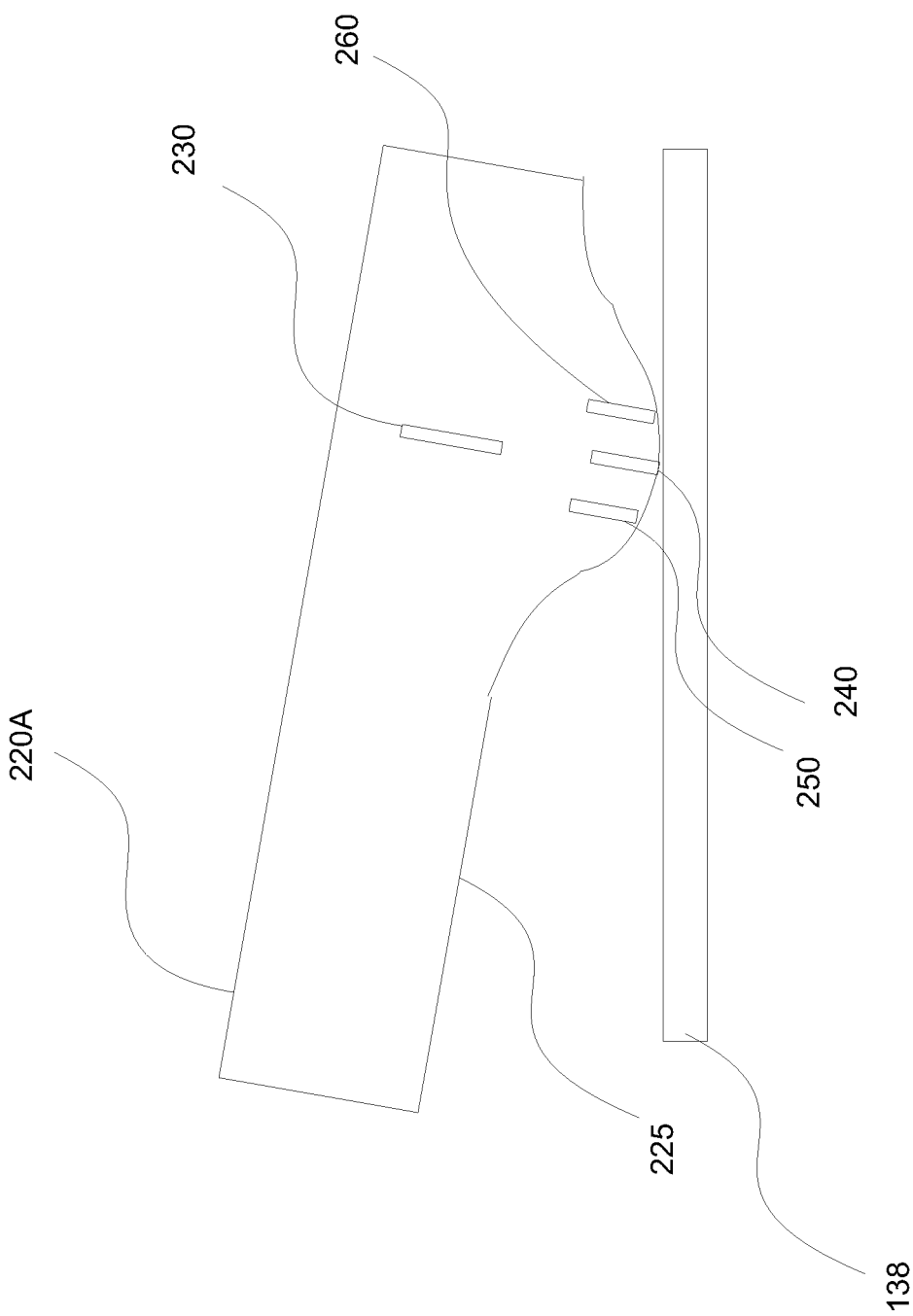
FIGS. 2A-B illustrates disk/magnetic head contact, in accordance with an embodiment of the present invention.

FIG. 2A depicts magnetic head 220A (or head slider), in accordance to an embodiment of the present invention. Magnetic head 220A includes air bearing surface (ABS) 225, TFC 230, embedded contact sensor (ECS) 240, read head 250, and write head 260.

TFC 230 is configured to heat magnetic head 220A in order to facilitate in controlling a fly height between magnetic head 220A and magnetic disk 138. For example, when power is applied to TFC 230, magnetic head 220A expands in the region of TFC 230 such that the fly height is decreased.

Moreover, TFC 230 is further configured to facilitate in detecting a contact between magnetic disk 138 and magnetic head 220A. As described above, power to TFC 230 is gradually increased during the manufacturing test for HDD 100. If contact is detected between magnetic head 220A and disk 138, the power corresponding to the specified clearance is subtracted from the applied power and stored as the standard applied power for that head. This calibration procedure is referred to as manufacturing touch down detection.

In conventional manufacturing touch down detection, the following methods (in conjunction with a TFC) may be used: (1) VCM current mean (mean), (2) VCM current sigma (standard deviation), (3) sigma of the positioning error signal (PES), (4) servo variable gain amplifier (VGA) mean, or (5) servo VGA sigma. With the previously mentioned methods, the current clearance is only several nanometers (nm). When differences in the conditions during the manufacturing test and during use are considered, the current clearance is close to the limit. Therefore, the danger of unintended contact during use increases.

ECS 240 is disposed in proximity to read head 250 and write head 260. ECS 240 is configured to facilitate in "in-situ touch down detection" of contact between the magnetic disk 138 and magnetic head 220A and also high-precision manufacturing touch down detection. Conceptually, ECS 240 is a resistive element embedded in magnetic head 220A. ECS 240 can confirm contact between magnetic head 220A and magnetic disk 138 through the phenomenon of thermal asperity (TA) where the resistance of ECS 240 is changed by heat due to friction.

In particular, a change in the resistance value is measured from the voltage or the current when a fixed current or a fixed voltage is applied to ECS 240. In one embodiment, ECS 240 is a resistive element. The resistance of ECS 240 is changed by the head-disk contact. Generally, the resistance value of ECS 240 is increased by the temperature increase caused by the contact. Thus, the circuitry associated with ECS 240 monitors the resistance of ECS 240 and detects a change in the resistance of ECS 240 caused by the head-disk contact. For example, as depicted in FIG. 2A, a change in resistance to ECS 240 occurs due to magnetic head 220A contacting magnetic disk 138.

Due to the resistive nature, ECS 240 provides higher contact sensitivity than the conventional methods, as describe above. However, ECS 240 can be used in combination and simultaneously with the conventional methods to enhance the manufacturing touch down detection.

In one embodiment, if both (1) ECS 240 and (2) a conventional contact detection method (e.g., VCM current mean) detect or report contact between magnetic head 220A and magnetic disk 138, then it is deemed that a true or real touch down power has occurred.

In another embodiment, if (1) ECS 240 does and (2) a convention contact detection method does not detect or report contact between magnetic head 220A and magnetic disk 138, then it is deemed that a true or real touch down power has occurred.

True or real contact is (1) physical contact of magnetic disk 138 with read head 250 or write head 260 or (2) physical contact of magnetic disk 138 with the magnetic head in the vicinity of read head 250 or write head 260. For example, true contact would be deemed if ECS 240 was in contact with magnetic disk 138 because ECS 240 is in a positional relationship equivalent to read head 250 and write head 260. In another example, true contact occurs when the apex of a protrusion bulge caused by TFC 230 comes into contact with magnetic disk 138.

Figure 2B:
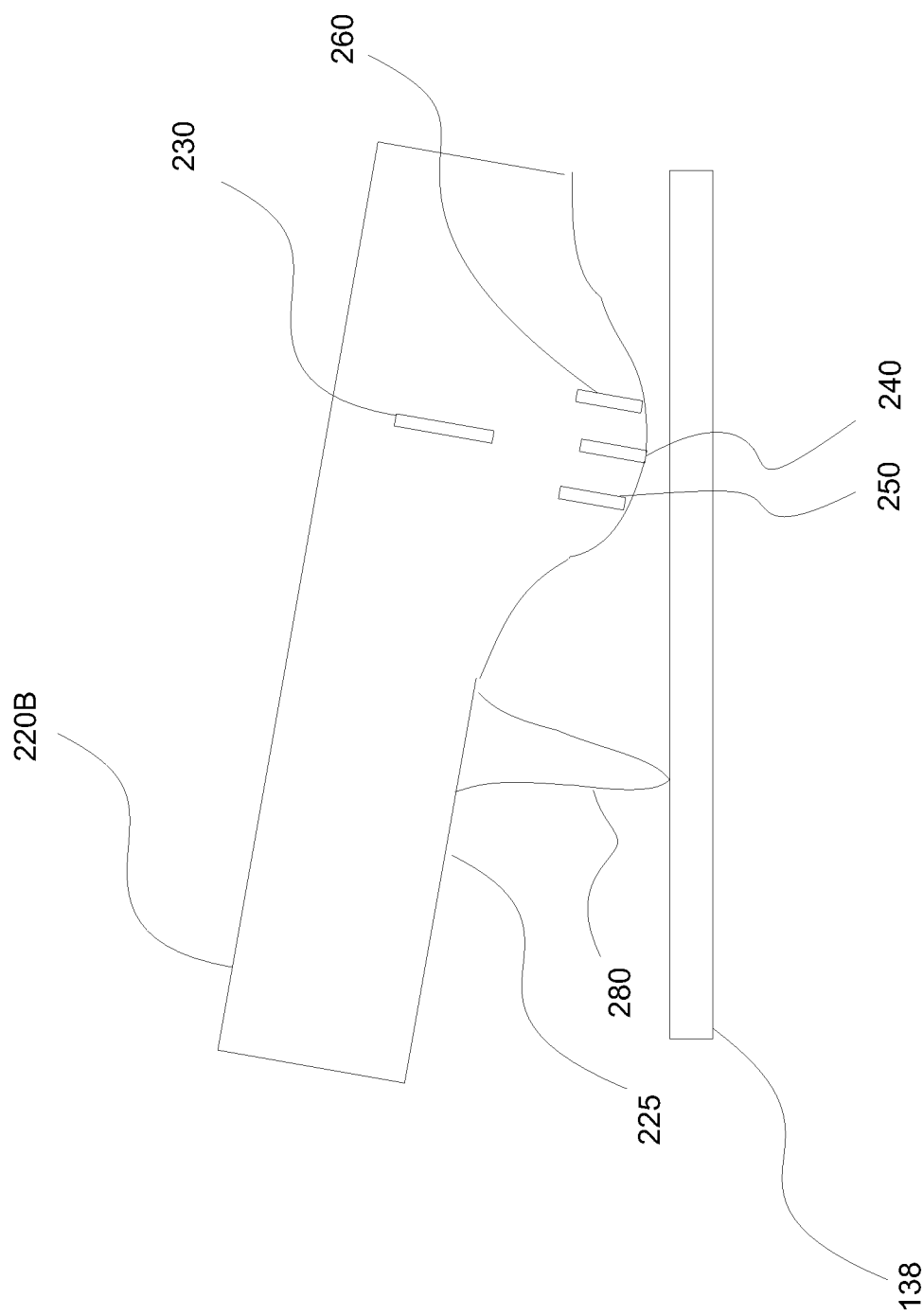

FIG. 2B depicts magnetic head 220B, in accordance to an embodiment of the present invention. Magnetic head 220B is similar to magnetic head 220A, however, magnetic head 220B includes ABS fence (e.g., contamination) 280. ABS fence 280 often exists near an ABS groove or pocket (not shown).

In one embodiment, if (1) ECS 240 does not and (2) a conventional contact detection method does detect or report contact between magnetic head 220B and magnetic disk 138, then it is deemed that a pseudo touch down power has occurred. For example, as depicted in FIG. 2B, ECS 240 does not detect contact because the area in proximity to ECS 240 cannot contact magnetic disk 138 due to the contact of ABS fence with magnetic disk 138.

A pseudo contact is contact caused by ABS fence 280 or a foreign matter (contaminant) on the ABS (often present near an ABS groove or pocket). In pseudo contact, the probability of not providing the desired recording and playback performance is high because read head 250 and write head 260 are not sufficiently close to magnetic disk 138.

In conventional manufacturing touch down detection, the differentiation between true contact and pseudo contact is difficult, because frictional forces and frictional oscillations resembling true contact also act during pseudo contact.

Once a pseudo contact has occurred, ABS fence 280 should be removed by head burnishing. As a result of burnishing, the clearance between ABS fence 280 and magnetic disk 138 is greater than the clearance between ECS 240 and magnetic disk 138. Therefore, true contact can occur.

Referring now to FIG. 1 and FIG. 2B, magnetic head 220B with an ABS fence 280 moves between inner diameter (ID) and an outer diameter (OD) of magnetic disk 138. Typically, magnetic head 220B tilts in opposite directions at the ID and OD because of skew. Accordingly, burnishing of ABS fence 280 may be more appropriate at either ID burnishing zone 145 or OD burnishing zone 140 depending on the orientation of ABS fence 280 with respect to ECS 240. In one embodiment, OD burnishing zone 140 has a wider area than ID burnishing zone 145.

It should be appreciated that ID burnishing zone 145 and OD burnishing zone 140 are not data zones. Therefore, there is no potential of data loss. Moreover, burnishing at OD burnishing zone 140 may be more appropriate because the circumferential velocity is faster at the OD as compared to ID.

In one embodiment, burnishing of ABS fence 280 occurs at ID burnishing zone 145. For example, if pseudo contacts are generated in proximity to ID of magnetic disk 138, then burnishing of ABS fence 280 is performed at ID burnishing zone 145.

In another embodiment, burnishing of ABS fence 280 occurs at OD burnishing zone 140. For example, if pseudo contacts are generated in proximity to OD of magnetic disk 138, then burnishing of ABS fence 280 is performed at OD burnishing zone 140.

In a further embodiment, burnishing of ABS fence 280 occurs at OD burnishing zone 140 and/or ID burnishing zone 145. For example, if pseudo contacts are generated in proximity to the ID and OD of magnetic disk 138, then burnishing of ABS fence 280 is performed at OD burnishing zone 140 and/or ID burnishing zone 145.

Figure 3:
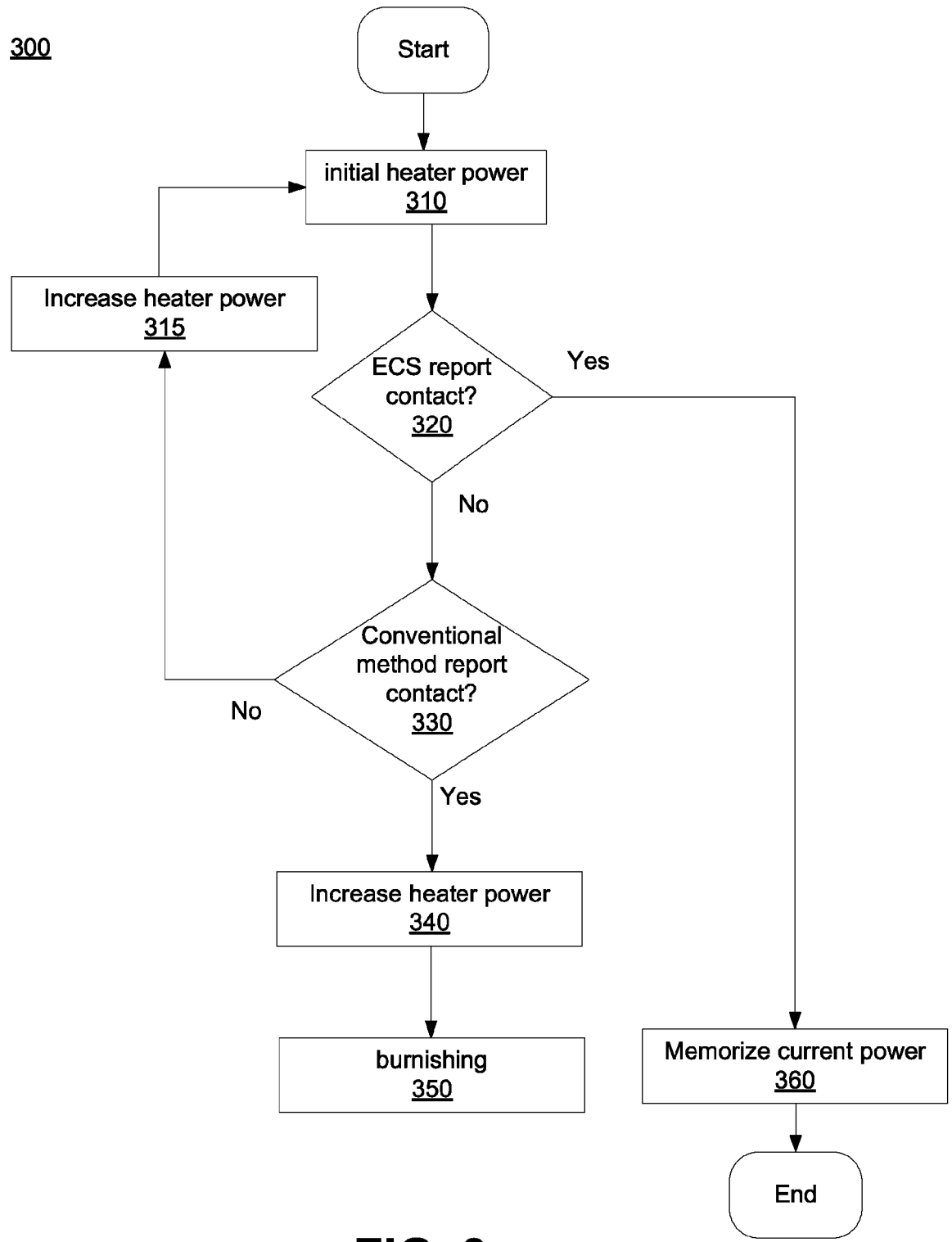
FIG. 3 illustrates an example of a flow chart for removing an ABS fence, in accordance with an embodiment of the present invention.

FIG. 3 depicts a flow chart for removing ABS fence 280, in accordance to an embodiment of the present invention. At 310, the heater power of TFC 230 is applied at the initial value. If ECS 240 reports contact (at 320), the numerical value of the applied heater power is stored as the touch down power (at 360).

If the ECS 240 does not report contact (at 320) and contact is not reported by the conventional method (at 330), the heater power is increased (at 315). This is repeated until contact is reported.

If ECS 240 does not report contact (at 320), but contact is reported by the conventional method (at 330), the judgment can be pseudo contact. In this case, the heater power is increased (at 340). Expansion caused by heat is much larger than normal, and the burnishing effect is obtained (at 350). When the burnishing process ends, the flow for the initial contact confirmation is restored in order to confirm the report of true contact before pseudo contact.

FIG. 4 depicts method 400 for contact detection, in accordance with an embodiment of the present invention. In various embodiments, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 400 is performed at least by HDD 100.

At 410 of method 400, detection of a contact between a magnetic disk and a magnetic head is performed based, in part, on a TFC. At 420 of method 400, detection of the contact between the magnetic disk and the magnetic head is performed based on an ECS. At 430 of method 400, in response to detecting the contact based on said TFC and the ECS, the contact is deemed as true contact between the magnetic disk and the magnetic head.

In one embodiment, at 440 of method 400, in response to detecting the contact based on the ECS and not on the TFC, the contact is deemed as true contact between the magnetic disk and the magnetic head.

In another embodiment, in response to detecting the contact based on the TFC and not on the ECS, the contact is deemed as pseudo contact between the magnetic disk and the magnetic head.

FIG. 5 depicts method 500 for burnishing, in accordance with an embodiment of the present invention. In various embodiments, method 500 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 500 is performed at least by HDD 100.

At 510 of method 500, in response detecting a contact between a magnetic disk and a magnetic head based on a TFC and not based on an ECS disposed in the magnetic head, the magnetic head is burnished to remove an ABS fence. In one embodiment, at 512, the magnetic head is burnished until the ECS detects the contact. In another embodiment, at 514, the magnetic head is burnished on a burnishing zone of a magnetic disk. For example, at 516, the magnetic head is burnished on an inner diameter burnishing zone of the magnetic disk. In another example, at 518, the magnetic head is burnished on an outer diameter burnishing zone of the magnetic disk.

At 520 of method 500, power to the TFC is increased until the ECS detects the contact.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive (HDD) comprising:
a magnetic disk;
a magnetic head;
an embedded contact sensor (ECS) embedded in said magnetic head and configured to detect a contact between said magnetic disk and said magnetic head; and
a thermal fly height control (TFC) embedded in said magnetic head and configured to facilitate in detecting said contact between said magnetic disk and said magnetic head, wherein in response to detecting said contact based on said TFC and not on said ECS, deeming said contact as pseudo contact between said magnetic disk and said magnetic head.

2. The HDD of claim 1 wherein said contact comprises:
a true contact between said magnetic disk and said magnetic head.

3. The HDD of claim 1, wherein said contact comprises:
a pseudo contact between said magnetic disk and said magnetic head.

4. A method for contact detection, said method comprising:
performing detection of a contact between a magnetic disk and a magnetic head based, in part, on a thermal fly height control (TFC);
performing detection of said contact between said magnetic disk and said magnetic head based on an embedded contact sensor (ECS);
in response to detecting said contact based on said TFC and said ECS, deeming said contact as true contact between said magnetic disk and said magnetic head; and
in response to detecting said contact based on said TFC and not on said ECS, deeming said contact as pseudo contact between said magnetic disk and said magnetic head.

5. The method for contact detection of claim 4, said method comprising:
in response to detecting said contact based on said ECS and not on said TFC, deeming said contact as true contact between said magnetic disk and said magnetic head.

6. A method for burnishing, said method comprising:
in response to detecting a contact between a magnetic disk and a magnetic head based on a thermal fly height control (TFC) and not based on an embedded contact sensor (ECS) disposed in said magnetic head, burnishing said magnetic head to remove an air bearing surface (ABS) fence.

7. The method for burnishing of claim 6, wherein said burnishing said magnetic head comprises:
burnishing said magnetic head until said ECS detects said contact.

8. The method for burnishing of claim 6, wherein said burnishing said magnetic head comprises:
burnishing said magnetic head on a burnishing zone of a magnetic disk.

9. The method for burnishing of claim 8, wherein said burnishing said magnetic head comprises:
burnishing said magnetic head on an inner diameter burnishing zone of said magnetic disk.

10. The method for burnishing of claim 8, wherein said burnishing said magnetic head comprises:
burnishing said magnetic head on an outer diameter burnishing zone of said magnetic disk.

11. The method for burnishing of claim 6, said method comprises:

increasing power to said TFC until said ECS detects said contact.

* * * * *